UNITED STATES PATENT OFFICE.

BYRON B. GOLDSMITH, OF NEW YORK, N. Y.

INDURATED ALBUMINOID COMPOUND.

1,027,121. Specification of Letters Patent. Patented May 21, 1912.

No Drawing. Original application filed October 7, 1907, Serial No. 396,189. Divided and application filed January 2, 1909, Serial No. 470,393. Divided and this application filed April 27, 1910. Serial No. 558,033.

*To all whom it may concern:*

Be it known that I, BYRON B. GOLDSMITH, a citizen of the United States, residing in the borough of Manhattan, city, county, and State of New York, have invented a certain new and useful Improvement in Indurated Albuminoid Compounds, of which the following is a specification.

In my U. S. Patent Number 840,931, dated January 8th, 1907 I have described a process whereby a thermoplastic compound may be made from casein or its derivatives, as a convenient and cheap substitute for celluloid, rubber and the like; and I made it clear in said patent that the term "thermoplastic" was meant to describe those masses which, while relatively hard at ordinary temperatures, are rendered softer by heat, so as to permit the uniting of separate masses and the molding of any mass to any desired shape.

My present invention is based upon the discovery that, by uniting the action of converting agents with that of an indurating agent, such as formaldehyde, or its equivalents, upon vegetable albuminoids or proteids and their derivatives or compounds, an improved result is obtained, and the respective actions of the indurating agent and converting agent are not destroyed.

My novel invention is based upon the discovery that a vegetable albuminoid which has been modified by the action of formaldehyde or its equivalent is capable of being rendered thermoplastic by combination with a converting agent; and furthermore that the thermoplastic compound so produced has certain advantages over that produced in accordance with my aforesaid U. S. Letters Patent The converting agent in my process is that chemical substance which, when combined or admixed with the albuminoid, acts whenever heated, to soften the same, but whose softening action is suspended or materially diminished upon lowering the temperature of the mass. Some of these converting agents are alpha-naphthol, beta-naphthol, benzoic acid, carbolic acid, hydrochinone, cresol, pyrocatechin, resorcin, salicylic acid, urea, phthalic acid, phloroglucin, pyrogallol, paratoluidin, naphthylamin, benzidin, oxy-naphthoic acid, alinin, toluidin and xylidin. Although these substances and their derivatives and compounds are known to me to give good results for the purposes above set forth, it is to be understood that I do not limit myself to these substances and their derivatives and compounds, but that the term "converting agent" as used herein refers to any compound or substance having the effect described.

One characteristic of a preferred "converting agent" is its capacity to remain in the mass and not be volatilized to a material extent when moderate heat is applied. I have discovered that the best results are obtained by the use of solid reagents such as alpha or beta naphthol and I have claimed this variant of my process and product specifically herein. Where flexibility is desired in the product, however, I have discovered that a liquid converting agent or other liquid not antagonistic to the mixture may be combined with a solid converting agent to great advantage.

The vegetable proteids form numerous compounds and derivatives, and it is to be understood that, where "vegetable proteid" is claimed herein, this term covers such compounds and derivatives as well.

Certain converting agents are better adapted to be used with some vegetable proteids than with others, and in many cases the derivatives of such proteids or their compounds, or combinations of two or more proteids (their derivatives or compounds) give results superior to those resulting from use of a single unchanged proteid.

The degree of hardness of the thermoplastic compound in the cold state will vary with the particular converting agent or agents employed and with the proportions used. Thus a great variety of characteristics are obtained by suitable variations in proportions and qualities.

In the manufacture of my composition the vegetable proteid after treatment with the indurating agent may be united with a suitable converting agent on and between suitably heated rolls, or any other method of uniting these substances may be resorted to by which they are brought into intimate contact. Instead of using the converting agents in their natural state they may be first dissolved in alcohol, water or other suitable liquid which is afterward driven off by heat.

The term "indurating agent" as used herein applies to those agents which, like formaldehyde, give to the compound greater toughness and permanency, increasing its resistance to the action of water. I have also found that where the vegetable albuminoid is treated with an indurating agent and afterward combined with a converting agent to produce a thermoplastic compound, the tendency of the mass to stick to the mold is much lessened, and thus a better impression is produced in molded articles. The use of formaldehyde or its equivalent in the manner herein specified has another valuable advantage. It is found that when the converting agent is a solid one and is used without an indurating agent in sufficient quantities to make an easily moldable mass, there is a tendency for the converting agent to separate and form a deposit upon the surface of the finished article. This gives a spotted appearance, which would make an article unmarketable. On the other hand, if the indurating agent is used, this tendency is entirely overcome, and a composition made in accordance with my present invention can be made as plastic as desired without danger of spotting through the cause above described.

In carrying out my invention a variety of reagents in various proportions may be employed. The following specific process may be taken as a typical example. The vegetable albuminoid or proteid is treated with formaldehyde or its equivalent in any desired manner, as by sprinkling and thoroughly moistening with an aqueous solution of formaldehyde. The amount and strength of the indurating agent and the length of time it is allowed to act upon the casein should be regulated according to the nature of the compound desired. Take four pounds of gluten which has been treated as aforesaid and sprinkle the same with about a pound and a half of beta-naphthol dissolved in alcohol. This is then well mixed, preferably on suitably heated rolls, and, when the mixture is completed, the mass is removed and is soft while hot but hardens on cooling. In this manner sheets of thermoplastic material are produced which are quite plastic while hot, but harden on cooling. Scraps of various substances may be mixed in with the masses thus formed in considerable quantities. Among these are celluloid scraps, finely divided albuminoids, bits of horn, rubber, resins, gums and coloring matter. Compounding substances or fillers can also be incorporated without departing from this invention.

I have found that, in order to obtain the best results a "non-hygroscopic" converting agent should be used, and I have made a specific claim herein for converting agents of this character.

It is to be understood that my process may be carried out with a greater or less degree of induration, and in some cases it is not advisable to carry this process very far. The indurating agent may be obviously first employed in manufacture of the material before compression and a second time upon the compressed mass or on the finished article.

This application is a division of my pending application for improvement in "Indurated albuminoid compound," Serial No. 470393, filed Jan. 2nd 1909, which is itself a division of my earlier application for indurated thermoplastic compound, Serial No. 396189, filed Oct. 7th 1907.

What I claim is—

1. The process of producing a thermoplastic compound which consists in first causing an indurating agent to act upon a vegetable albuminoid and then mixing a converting agent therewith, substantially as described.

2. The process of producing a thermoplastic compound which consists in first causing an indurating agent to act upon a vegetable albuminoid, then mixing a converting agent therewith, and heating and pressing the mass, substantially as described.

3. The process of producing a thermoplastic compound which consists in first mixing an indurating agent with a vegetable albuminoid, mixing a converting agent with the mass so produced, and heating and pressing the same, substantially as described.

4. The process of producing a thermoplastic compound which consists in first treating a vegetable albuminoid with formaldehyde, mixing the mass so produced with a converting agent, and heating and pressing the same, substantially as described.

5. The process of producing a thermoplastic compound which consists in first treating a vegetable albuminoid with an indurating agent, mixing the mass so produced with beta-naphthol or its equivalent, and heating and pressing the same, substantially as described.

6. The process of producing a thermoplastic compound which consists in first treating a vegetable albuminoid with formaldehyde, mixing the mass so produced with beta-naphthol or its equivalent, and heating and pressing the same, substantially as described.

7. The process of producing a thermoplastic compound which consists in mixing an indurating agent with a vegetable albuminoid, mixing the mass so produced with a normally solid converting agent, and heating and pressing the same, substantially as described.

8. The process of producing a thermoplastic compound which consists in mixing an indurating agent with a vegetable albuminoid, mixing the mass so produced with a normally solid and substantially non-volatile converting agent, and heating and pressing the same, substantially as described.

9. A composition of matter composed of a more or less indurated vegetable albuminoid mixed with a converting agent, substantially as described.

10. A composition of matter composed of a more or less indurated vegetable albuminoid mixed with a normally solid converting agent, substantially as described.

11. A composition of matter composed of a more or less indurated vegetable albuminoid mixed with a normally solid and substantially non-volatile converting agent, substantially as described.

12. A composition of matter composed of a more or less indurated vegetable albuminoid mixed with beta-naphthol or its equivalent, substantially as described.

BYRON B. GOLDSMITH.

Witnesses:
  H. S. MACKAYE,
  M. A. BUTLER.